(12) United States Patent  
Blanford

(10) Patent No.: US 7,549,585 B2  
(45) Date of Patent: Jun. 23, 2009

(54) METHODS AND APPARATUS FOR PREVENTING IMPROPER SCANS BY A BAR CODE SCANNER

(75) Inventor: Denis Michael Blanford, Duluth, GA (US)

(73) Assignee: NCR Corporation, Dayton, OH (US)

( * ) Notice: Subject to any disclaimer, the term of this patent is extended or adjusted under 35 U.S.C. 154(b) by 347 days.

(21) Appl. No.: 11/498,345

(22) Filed: Aug. 3, 2006

(65) Prior Publication Data

US 2008/0029604 A1 Feb. 7, 2008

(51) Int. Cl.
*G02B 5/08* (2006.01)
(52) U.S. Cl. .............................. 235/462.36; 235/462.33
(58) Field of Classification Search ............ 235/462.32, 235/462.18, 462.36, 462.08, 462.12, 462.33
See application file for complete search history.

(56) References Cited

U.S. PATENT DOCUMENTS 6,932,273 B2 * 8/2005 McQueen ............... 235/462.25
7,108,187 B2 * 9/2006 Turvy et al. ............. 235/462.08
2005/0219053 A1 * 10/2005 Clifford et al. ........... 340/572.4

* cited by examiner

Primary Examiner—Edwyn Labaze
(74) Attorney, Agent, or Firm—Priest & Goldstein, PLLC; Harden E. Stevens, III

(57) ABSTRACT

Systems and techniques for prevention of double scans of bar codes by identifying the possibility of ambiguities in position information estimated upon detection of a bar code. A bar code scanner estimates position information for a bar code upon detection of the bar code. Timing information for each detection and the accompanying position estimate is maintained, and lapses of time between detections and accompanying position estimates are noted. When successive scans of identical bar code information occur, the lapses of time are evaluated in light of predetermined criteria to determine whether or not an ambiguity exists that prevents reliable identification the scans as a double scan of the same bar code or successive scans of separate but identical bar codes.

19 Claims, 2 Drawing Sheets

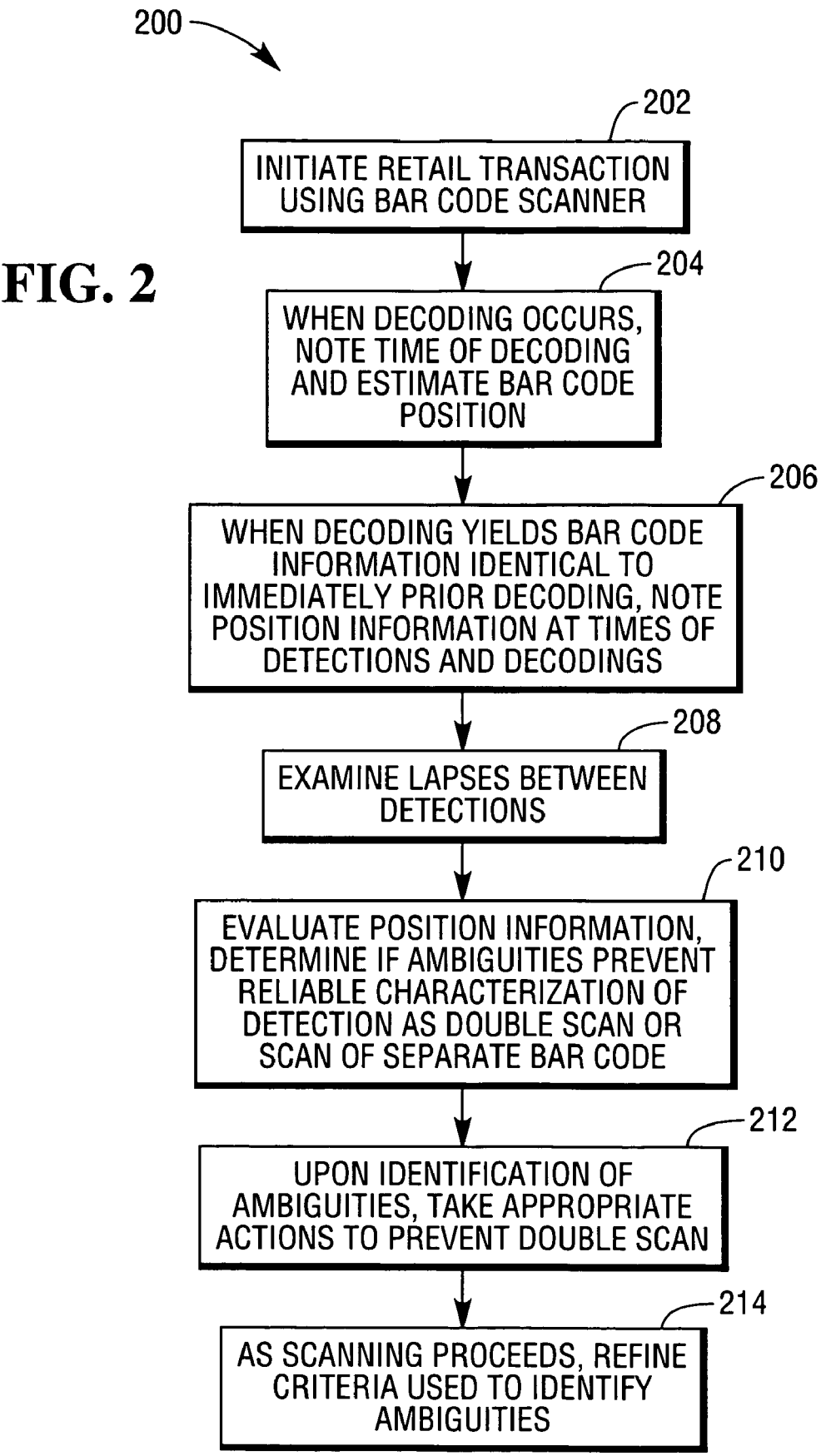

METHODS AND APPARATUS FOR PREVENTING IMPROPER SCANS BY A BAR CODE SCANNER

FIELD OF THE INVENTION

The present invention relates generally to improvements to techniques and systems for bar code scanning. More particularly, the invention relates to improved systems and techniques for using position information to prevent double scans of the same bar code label, as well as identifying situations in which position information cannot reliably identify a double scan due to the occurrence of a lapse of time between bar code detections during which no bar code detection occurs and during which no position estimate can be made.

BACKGROUND OF THE INVENTION

Bar code scanners are widely used in retail transactions. In a typical scenario, a product bearing a bar code is introduced into a scan volume of a scanner, which sweeps a laser beam through a scan volume in a pattern determined by the design of the scanner. When the laser beam sweeps across the bar code, light is reflected from the bar code into the scanner to generate a scan signal, which is processed in order to decode the bar code. In a common scenario, an operator passes a product bearing a bar code across a scan window, moving the product and the bar code through the scan volume, with the bar code being intersected by scan lines for detection and decoding of the bar code. In a typical operation, a number of products, some of which may be identical, and therefore may bear identical bar codes, are passed through the scan volume in a transaction.

In order to provide for accurate and efficient processing of transactions, it is useful to provide for automatic means of distinguishing valid from invalid detections and decodings. For example, it is useful to provide means for preventing an erroneous double read of the same bar code on the same object.

Many scanners are capable of estimating position information for a bar code label. When a full or partial decoding is performed on a label, information useful for determining the position of the bar code in the scan zone is noted and may be used to compute an estimate of the label's location. If a label is consecutively intersected by scan lines, successive position estimates may be computed in order to enhance scanning accuracy. Position information for a bar code label, particularly successive position estimates indicating a trajectory of the label through the scan volume, are useful for preventing double scans of the same label by providing information that can be used to establish whether or not successive detections of identical label information result from successive scans of the same label or scans of different but identical labels. Such information may include whether or not successive detections occur along a trajectory that may be reasonably expected to be followed by a label being moved through a scan zone. Examples of systems using position estimation for bar code labels are disclosed in Blanford U.S. Pat. Nos. 6,347,741 and 6,220,513, assigned to the assignee of the present invention and incorporated herein by reference in their entirety. Another example of a system using position estimation to enhance scanning accuracy for bar code labels, with the system using position information to avoid erroneous double scans, is Heske U.S. patent application Ser. No. 11/455,472, filed on Jun. 19, 2006, assigned to the assignee of the present invention and incorporated herein by reference in its entirety.

In some cases, particularly in cases in which small bar code labels are scanned, successive position estimates are difficult to obtain. For example, a label may be fully or partially decoded upon intersection by a scan line, but then will not be intersected by additional scan lines for some time, because the label is so small that it will pass through gaps in the scan pattern. At some future time, the label will again be intersected by a scan line and detection will occur, but there will be a period in which no detection has occurred and no tracking information has been received. The trajectory of the bar code is then uncertain. Also, many scanners are adapted for omnidirectional scanning, in which a label may be introduced into the scan zone from any direction. Thus, in many cases, even if position estimates are obtained for bar code labels being detected, cases may occur in which successive detections of the same label are misinterpreted as scans of identical but different labels.

SUMMARY OF THE INVENTION

Among its several aspects, the present invention addresses such exemplary difficulties, as well as others, and achieves a number of advantages, by identifying periods in which reliable location information for a bar code label is not being received, and evaluating the duration of such periods to determine whether or not a detection can determined to be a second detection of the same bar code or to result from the introduction of a separate but identical bar code. When a complete or partial detection occurs, location information for a bar code, along with timing information for the location information, is received. With each successive complete or partial detection, location and timing information is received and evaluated to determine if a lapse of time occurs in between detections, sufficient in duration to indicate an ambiguity that renders it uncertain whether a successive detection results from a scan of an identical but separate label. If such an ambiguity exists, the scanner takes necessary steps to prevent a double read. An example of steps to be taken may include sounding a specially chosen tone or otherwise alerting an operator that an unidentifiable detection has occurred. Such an alert may, for example, allow the operator to rescan a product. Another example might include imposing a stricter criterion for recognizing a good scan. For example, the second detection of a bar code that was initially determined to be ambiguous might be required to be intersected by more scan lines than typically required before being recognized as a second read.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates a process of bar code scanning using position information and accounting for the possibility of ambiguity according to an aspect of the present invention.

DETAILED DESCRIPTION

Figure 1:
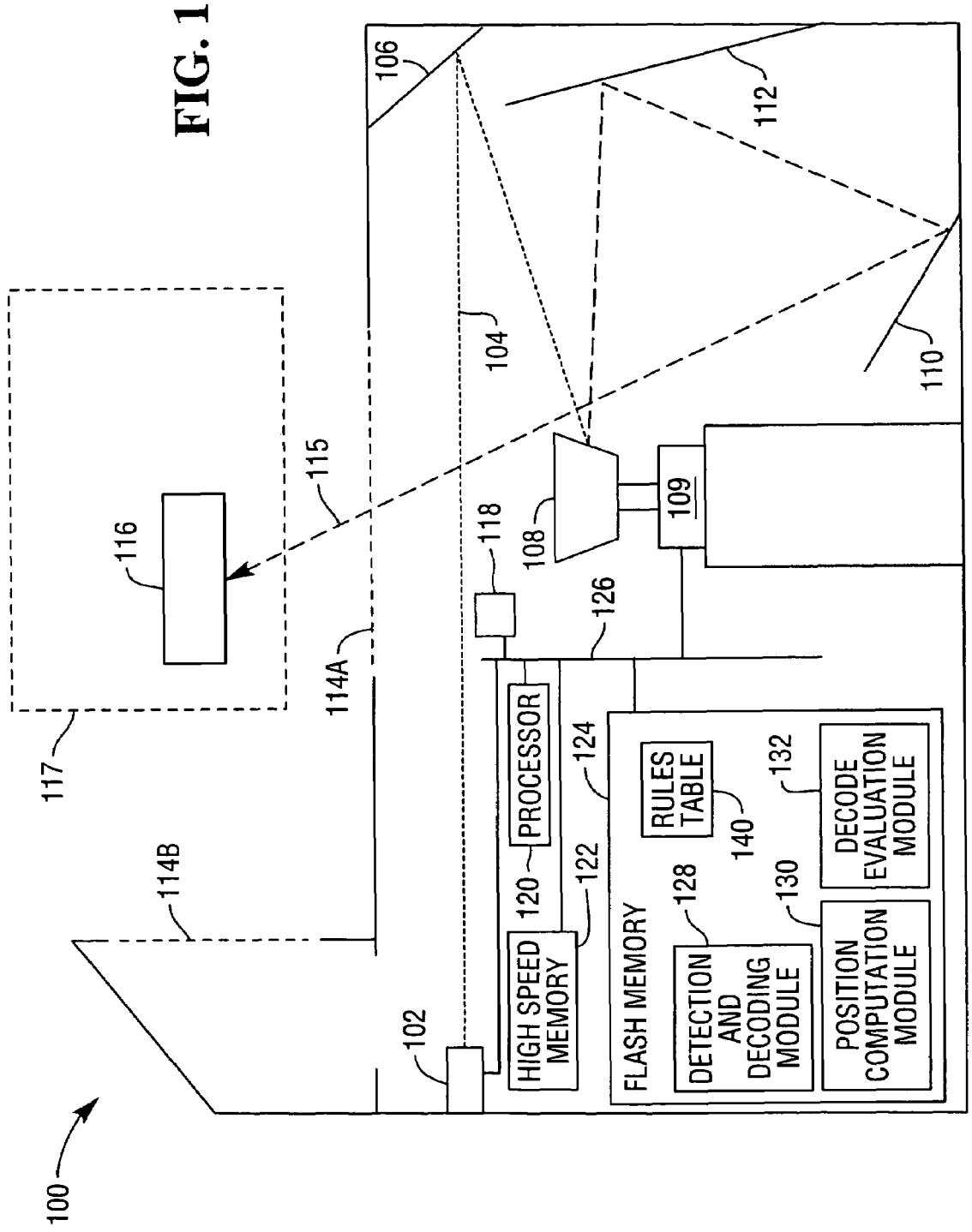
FIG. 1 illustrates a scanner according to an aspect of the present invention.

FIG. 1 illustrates a bar code scanner 100 according to an aspect of the present invention. The scanner 100 includes a laser 102 emitting a laser beam 104. The laser beam 104 is directed to a deflector mirror 106 and is reflected to strike a rotating polygonal spinner 108, which is rotated by a spinner motor 109. The scanner 100 includes a set of primary mirrors, represented by a primary mirror 110 illustrated here, as well as a set of secondary mirrors, represented by a secondary mirror 112 illustrated here. While the present exemplary scanner 100 includes primary and secondary mirrors, it will be recognized that this specific configuration is not required and that the present invention may be practiced using scanners employing any desired technique for producing scan patterns, such as the use of only primary mirrors in addition to a spinner, or the generation of scan patterns using a spinner alone without any fixed mirrors, for example.

Once the laser beam 104 is reflected from the spinner 108, it is directed to one of the primary mirrors and from there to one of the secondary mirrors. As the spinner 108 rotates in the path of the laser beam 104, it will direct the laser beam 104 along different paths. In a typical scanner having primary and secondary mirrors, a laser beam will be directed along numerous different paths as a spinner rotates, so that the laser beam will be directed along numerous different paths determined by a wide variety of combinations of primary and secondary mirrors.

Once the laser beam 104 is on its final path out of the scanner 100, it is conveniently called a scan beam, and is directed to and out of one of the scan windows 114A and 114B. Here, a scan beam 115 is shown, emerging from the scan window 114A to strike an object 116 in a scan zone 117.

As the spinner 108 rotates, the angle of reflection of the laser beam 104 from the spinner 108 changes, causing the scan beam 115 to move. The rotation of the spinner 108 causes the scan beam 115 to move across the scan window 114A, causing it to trace out scan lines. In addition, the rotation of the spinner 108 and the change of the spinner facet from which the laser beam 104 is reflected causes the path traveled by the laser beam 104 to change, so that the laser beam 104 is reflected from different sets of primary and secondary mirrors, generating numerous different scan beams emerging from the scan windows 114A and 114B. During each rotation of the spinner 108, a scan pattern emerges from each of the scan windows 114A and 114B, each scan pattern being created through the tracing out of a plurality of scan lines emerging from the scan window. For the sake of simplicity, scan beams other than the scan beam 115 are not shown here, but in a typical embodiment, they will emerge from their respective scan windows 114A and 114B and have paths originating at numerous different points and numerous different directions. Determination of the origin and direction of a scan beam, such as the scan beam 115, intersecting a bar code at a particular time, can be used to compute the position of the bar code in a scan volume of the scanner 100.

The scanner 100 also includes a photodetector 118. The photodetector 118 produces an electrical signal, suitably referred to as a scan signal, when struck by light. The scan signal is processed to extract bar code information from light resulting from the reflection of a scan pattern from a bar code into one of the scan windows 114A and 114B and back to the photodetector 118. For example, the photodetector produces a signal when struck by light directed into the scan window 114A when the scan beam 115 strikes an object in a scan volume outside the scan window 114A.

The scanner 100 suitably includes data processing resources in order to control the operation of the scanner 100, such as generation of scan patterns and processing of light reflected back into the scanner 100. The data processing resources include a processor 120, high speed memory 122, and relatively long term memory such as flash memory 124, communicating with one another and with various elements of the scanner 100 through a bus 126. The scanner 100 may suitably utilize various modules to control generation of scan patterns and processing of reflected light to decode bar codes. These modules may be implemented as software hosted in the flash memory 124 and transferred to high speed memory 122 as needed for execution by the processor 120.

These modules may include a detection and decoding module 128, a position computation module 130, and a decode evaluation module 132. The detection and decoding module 128 detects and decodes bar codes introduced into scan volumes outside each of the scan windows 114A and 114B and provides bar code identification information and decoding timing information to the position computation module 130 and the decode evaluation module 132. The position computation module 130 uses the timing information and bar code identification information to compute the position of a bar code at the time detection and decoding occurs, and to maintain an estimate of the position of the bar code as it moves through the scan volume. The position information, timing information, and bar code identification information are passed to the decode evaluation module 132 in order to provide the module 132 with information needed to evaluate scans based on information such as position and tracking information in order to improve scanning accuracy.

One particularly important function of the decode evaluation module 132 is the use of position information to prevent double reads, that is, to distinguish double scans of the same item from successive scans of identical but separate items. When consecutive detections of the same bar code information occur, the decode evaluation module 132 evaluates the position information associated with the bar code information against predetermined criteria. The criteria suitably include expectations of paths that a separate bar code may follow into or through a scan volume, as opposed to paths causing repeated detections of the same bar code.

When the detection and decoding module 128 receives information sufficient to detect and decode a bar code, the time at which detection occurred, and identification information for the bar code, are provided to the decode evaluation module 132. In addition, bar code information generated by the detection and decoding module 128 is also provided to the position computation module 130, along with timing information indicating when each element of information was decoded. Depending on the design of the scanner 100, the module 128 may provide timing and identification information to the position computation module 130 only when a bar code has been fully decoded, or may provide all information generated by full and partial decodings of bar codes to the module 130. The position computation module 130 computes position information for the bar code, and may receive bar code information reflecting repeated detections and decodings as the bar code is intersected by first one and then another scan line. The position computation module 130 may perform successive position computations, indicating a trajectory of the bar code as it is repeatedly intersected by scan lines. This position information is provided to the decode evaluation module 132 for use in evaluating decoding information received from the detection and decoding module 128. Most notably, the decode evaluation module 132 may use this information to prevent erroneous double scans.

In many cases, such as a case in which a small bar code label is being read, a bar code will not always be intersected by scan lines at frequent successive positions along its entire trajectory through the scan volume, but will undergo periods during which it is not intersected by any scan line. In some cases, it is possible for a bar code that has been detected and decoded to be moved through positions in which it is no longer intersected by scan lines, and to move through such positions until it is out of the scan zone 117. A second bar code might then be moved into the scan zone along a similar trajectory as that followed by the first bar code. The second bar code might not be intersected by a scan line until further along the trajectory than was the first bar code when it was intersected. Simply using position information associated with each detection, without taking into account the length of time that transpired between the detections, might result in the erroneous suppression of the detection of the second bar code.

In another scenario, a bar code might be intersected by a bar code, then remain in the scan zone for some time, then be intersected again, in a position typical of a bar code newly entering the scan zone. The successive positions would not necessarily indicate the possibility of a double scan, because the successive detections and accompanying position information would be consistent with a detection of a first bar code and then a second bar code.

In order to prevent erroneous identification of double scans, or failure to identify double scans when they exist, the decode evaluation module 132 uses timing and position information to identify periods when no detection occurs and no position information is received, and to take the occurrence of such periods into account when evaluating whether or not a double scan has occurred.

As noted above, when a detection of a bar code occurs, the detection and decoding module 128 transfers detection and decoding information to the position evaluation module 130 and the decode evaluation module 132. The position evaluation module 130 computes position information indicating the position of the bar code at the time of detection and provides this information to the decode evaluation module. The decode evaluation module 132 monitors detection information and position information that it receives and uses the information to prevent erroneous double scans.

The detection information and position information received by the decode evaluation module 132 is associated with timing information, indicating when each detection occurred. The decode evaluation module 132 uses this timing information to determine the reliability with which it can be determined that a detection of a bar code is a detection of a bar code that has already been detected and has moved to a different position in the scan zone 117, or is a detection of a bar code that is newly introduced into the scan zone 117. The decode evaluation module 132 suitably examines the elapsed time between detections and notes periods between detections. During these periods, a bar code may move within the scan zone 117. If the time period between detections is long enough, the bar code may have undergone significant movement during that time, so that the trajectory that the bar code has followed between detections cannot be determined. In order to determine whether such a condition has occurred, the decode evaluation module 132 suitably consults a rules table 140, storing rules used to manage responses to possible double scans and other conditions affecting the reliability of bar code detections and decodings. Among other information, the rules table 140 suitably stores criteria related to the receipt of detection and position information, and the time periods that elapse in the absence of such detection and position information. The rules table 140 suitably stores rules defining circumstances under which successive detections cannot be reliably determined to arise from successive scans of the same bar code or from scans of separate bar codes encoded with identical information. For example, a one second lapse of time between detections of identical bar code information, during which no position information is received, may be deemed sufficiently long to create ambiguity with respect to the source of successive detections. The criteria used to determine whether an ambiguity exists may take a number of factors into account.

For example, a particular bar code may be known to appear on larger or smaller labels, and thus may be more or less prone to moving about in the scan zone 117 without being intersected by a scan line. This fact may be taken into account in setting the time period that must elapse without detection or position information before a second detection will be deemed to be from an ambiguous source.

Another factor that may be considered is the position information that is received before a lapse occurs. For example, if a bar code is detected and determined to be toward the center of the scan zone 117, and a lapse occurs, followed by another detection of the bar code, this scenario may be treated differently than the case in which a bar code is detected at an edge of the scan zone 117 at which a bar code typically exits, followed by a lapse, followed by another detection. In the first case, the second detection may be determined to be from an ambiguous source, while in the second case, given a lapse of the same duration as in the first case, the second detection may be determined to be from a separate bar code, because in the second case there will be a greater expectation that the first detection occurred as the bar code was leaving the scan zone 117.

To take another example, suppose that in one case a lapse occurs after a number of successive detections have already occurred, providing position information over a significant trajectory. In another case, a lapse occurs after only one detection with accompanying position information. In the first case, the position information received before the lapse may advantageously be taken into account in determining whether a second detection is from an ambiguous source. For example, if the first detection after the lapse is along the same trajectory established before the lapse, the first post lapse detection may be deemed to result from a detection of the same bar code as it continues along its path.

The rules table 140 suitably includes information and criteria for evaluating these and numerous other situations, and for taking into account a wide variety of circumstances giving rise to periods where information is not received, bar code movement patterns, and similar considerations affecting the evaluation of conditions affecting the reliability of detection of double scans. One particularly useful source of information that may be used to build the rules table 140 is consideration of the circumstances under which successive detections of different bar code information occur. When detections of different bar code information are successively received, it is reliably known that the detection of different information does not result from a double scan of the first bar code. When such detection patterns occur, the decode evaluation module 132 can evaluate the existing circumstances, such as the number and duration of lapses between detections, bar code label sizes, trajectory and position information, in light of the fact that a detection has occurred that is unambiguously not a double scan. The decode evaluation module 132 can examine the conditions in light of this result to create or refine rules in the rules table 140.

In addition, particular operators may exhibit characteristic patterns of movement by which they move objects into and through the scan zone 117. Patterns characteristic of a particular operator can be learned as the operator moves objects through the scan zone 117. In many cases, objects may provide relatively continuous position data. For example, objects bearing relatively large bar code labels are relatively unlikely to experience lapses when no detection occurs and no position data can be estimated. Information useful for predicting operator movement patterns can be obtained from data collected relating to these and other objects, and can be used to refine the rules table 140. Such refinements may take into account predicted operator movement patterns in determining whether successive detections and decodings of identical bar code information arise from an ambiguous source.

When an ambiguity is identified, the decode evaluation module directs that appropriate actions be taken. Such actions may include using a read tone that is different from that normally used for a successful detection. The read tone may be different in length, pitch, or have whatever characteristics are desired, and may be accompanied by an inhibition of the entry of the decoded information. Such a combination of actions prevents a double read, but alerts the operator, allowing the operator to scan the bar code again if the bar code is in fact a separate bar code.

Another possibility is registering entry of the decoded information if a sufficient number of additional scan line intersections are detected. This has the effect of forcing the bar code to remain in the scan zone 117 for a relatively long period, something that is less likely if the bar code has already been in the scan zone 117 long enough to accomplish decoding.

FIG. 2 illustrates the steps of a process 200 of bar code scanning according to an aspect of the present invention, using position information and taking into consideration periods when position information is unavailable. At step 202, a retail transaction is initiated using a bar code scanner, with products being passed into a scan volume in order to allow for detection and decoding of bar codes on the products. Detection and decoding result from processing of a scan signal generated by reflection of light rays that represent a reflection of a scan pattern, one or more of whose scan lines intersect the bar code. At step 204, whenever a full or partial decoding of a bar code introduced into a scan volume of a scanner occurs, the time of the decoding is noted and position information for the bar code is estimated. At step 206, whenever a decoding of a bar code yields bar code information identical to that of an immediately prior decoding, position information for the bar codes at the times of detection and decoding is noted. At step 208, the duration of lapses between detections is examined, in order to identify lapses during which no position information is estimated. At step 210, the position information is evaluated against a set of rules, taking into account the occurrence and duration of lapses between detections, in order to evaluate whether or not the detections can be reliably attributed to repeated scans of the same bar code or successive scans of separate but identical bar codes. At step 212, when it is determined that successive detections cannot be reliably attributed to a double scan or successive scans, appropriate actions are taken. Such actions may include altering a read tone to alert an operator that an ambiguity exists, requiring additional bar code intersections before registering a reading of a bar code, or any number of other actions calculated to properly differentiate a double scan from consecutive scans of separate but identical bar codes. At step 214, as scans are performed of various bar codes, criteria for evaluating whether or not an ambiguity may exist between double scans and successive scans of separate but identical bar codes are refined.

While the present invention is disclosed in the context of a presently preferred embodiment, it will be recognized that a wide variety of implementations may be employed by persons of ordinary skill in the art consistent with the above discussion and the claims which follow below.

I claim:

1. A bar code scanner comprising:

an optical assembly for generating a scan pattern and producing a scan signal based on reflections of the scan pattern from a bar code;

a rules table where rules and criteria used to manage conditions affecting the reliability of bar code detection and decoding are stored; and a processor for processing the scan signal to decode a bar code based on information from a scan signal generated by a reflection of a scan line intersecting a bar code, the processor estimating a position of the bar code based on conditions prevailing at a time that the bar code is detected and to use position estimates to distinguish between consecutive scans of separate but identical bar codes and double scans of the same bar code, the processor being further operative to use rules and criteria from the rules table to recognize lapses of time in which no position estimate can be made and to evaluate position estimates and lapses of time in order to identify sets of scans that cannot be reliably identified as double scans or scans of separate but identical bar codes.

2. The scanner of claim 1, wherein the processor is operative to evaluate lapses of time in light of rules stored in the rules table, with the rules taking into account conditions relating to known characteristics and movement of a bar code in determining whether a specified lapse of time indicates a possibility of an ambiguity.

3. The scanner of claim 2, wherein the processor is operative to take known size information for a bar code label into account in determining whether a specified lapse of time indicates the possibility of an ambiguity.

4. The scanner of claim 2, wherein the processor is operative to take the extent of available bar code position information into account in determining whether a specified lapse of time indicates the possibility of an ambiguity.

5. The scanner of claim 2, wherein the processor is operative to take information relating to the positions of detected bar codes estimated before and after lapses of time into account in determining whether a specified lapse of time indicates the possibility of an ambiguity.

6. The scanner of claim 2, wherein the processor is operative to examine scan results and circumstances prevailing when the scan results were received in order to refine the criteria used to evaluate whether the possibility of an ambiguity exists.

7. The scanner of claim 6, wherein the processor is operative to take into account operator movement patterns in moving objects through a scan zone in refining the criteria used to evaluate whether the possibility of an ambiguity exists.

8. The scanner of claim 1, wherein the processor is operative to direct that an appropriate alert be provided to an operator when it is determined that a possibility of an ambiguity exists.

9. The scanner of claim 1, wherein the processor is operative to alter the conditions under which a successful scan will be recognized when it is determined that a possibility of an ambiguity exists.

10. The scanner of claim 1, wherein the processor examines the conditions in light of results of bar code detection and decoding and modifies the rules and criteria stored in the rules table to improve bar code detection and decoding results.

11. A method of bar code detection and decoding, comprising the steps of:

generating a scan signal upon reflection of a scan pattern from a bar code introduced into a scan volume;

maintaining a rules table where rules and criteria used to manage conditions affecting the reliability of bar code detection and decoding are stored processing the scan signal to perform bar code detection and decoding, processing of the scan signal including estimating position information indicating a position of the bar code in the scan volume and using position information to distinguish between double scans of the same bar code and successive scans of separate but identical bar codes, processing of the scan signal using rules and criteria from the rules table including taking into account lapses of time between bar code detections and estimates of bar code position information in order to determine whether an ambiguity exists preventing reliable characterization of a successive decoding of identical bar code information as arising from a double scan of the same bar code or successive scans of separate but identical bar codes.

12. The method of claim 11, wherein determining whether an ambiguity exists includes evaluating a duration of lapses of time in light of rules and criteria from the rules table affecting the reliability of the position information that has been received to distinguish between a double scan and successive scans of separate but identical bar codes.

13. The method of claim 10, wherein evaluating the duration of lapses of time includes taking known bar code label size information into account in evaluating whether an identified lapse of time indicates an ambiguity.

14. The method of claim 12, wherein evaluating the duration of lapses of time includes taking the extent of known bar code position information into account in evaluating whether an identified lapse of time indicates an ambiguity.

15. The method of claim 12, wherein evaluating the duration of lapses of time includes taking the positions of detected bar codes estimated before and after lapses of time into account in determining whether a specified lapse of time indicates the possibility of an ambiguity.

16. The method of claim 12, further comprising the step of examining scan results and the circumstances prevailing when the scan results were received in order to refine the criteria used to evaluate whether the possibility of an ambiguity exists.

17. The method of claim 16, wherein the step of examining scan results and the circumstances prevailing when the scan results were received includes defining patterns of operator movements in order to predict likely trajectories followed by objects through a scan zone.

18. The method of claim 11, further comprising the step of providing an alert to an operator when it is determined that a possibility of an ambiguity exists.

19. The method of claim 11, further comprising the step of examining the conditions in light of results of bar code detection and decoding and modifying the rules and criteria stored in the rules table to improve bar code detection and decoding results.

* * * * *